United States Patent [19]

Guthrie et al.

[11] 4,408,827
[45] Oct. 11, 1983

[54] IMAGING SYSTEM FOR HOSTILE ENVIRONMENT OPTICAL PROBE

[75] Inventors: Richard W. Guthrie, West Palm Beach, Fla.; Dale M. Byrne, Arlington, Tex.

[73] Assignee: United Technologies Corporation, Hartford, Conn.

[21] Appl. No.: 298,829

[22] Filed: Sep. 2, 1981

[51] Int. Cl.³ .................................................. G02B 5/14
[52] U.S. Cl. .................................. 350/96.10; 250/338; 350/96.24; 356/43
[58] Field of Search ............... 350/96.10, 96.24, 96.25, 350/96.26, 96.29, 96.30; 356/43, 44; 250/227, 338

[56] References Cited

U.S. PATENT DOCUMENTS

| | | | |
|---|---|---|---|
| 3,051,035 | 8/1962 | Root | 350/96.26 |
| 3,064,128 | 11/1962 | Duke | 350/96.10 X |
| 3,216,477 | 11/1965 | Devine | 350/96.24 X |
| 3,666,949 | 5/1972 | De Falco et al. | 350/96.24 X |
| 3,906,221 | 9/1975 | Mercier | 250/227 |
| 4,037,113 | 7/1977 | Moore | 350/96.10 X |

FOREIGN PATENT DOCUMENTS 2252000 5/1973 Fed. Rep. of Germany ... 350/96.24

Primary Examiner—John D. Lee
Attorney, Agent, or Firm—Eric W. Petraske

[57] ABSTRACT

An optical probe for collecting light from a defined region in a high temperature environment employs a pair of curved surfaces and a reflective surface to couple light from the defined area into an optical fiber while discriminating against light from other regions.

4 Claims, 2 Drawing Figures

IMAGING SYSTEM FOR HOSTILE ENVIRONMENT OPTICAL PROBE

DESCRIPTION

1. Technical Field

The field of the invention is that of an apparatus for collecting light from a defined area within a hostile environment and transmitting that light to a benign environment where it can be measured and analyzed.

2. Background Art

U.S. Pat. No. 3,051,035, issued to Root, discloses the use of an infrared sensitive probe mounted within a jet engine and bathed by the flame for transmitting light from that hostile environment to a benign environment outside the jet engine. The probe is enclosed in a protective sheath and does not focus or otherwise manipulate the light impinging on it. U.S. Pat. No. 3,906,221, issued to Mercier, discloses the use of a rugged optical element within a fuel burner. This element also does not focus or otherwise manipulate the light impinging on it and is also bathed in the flame.

DISCLOSURE OF INVENTION

This invention relates to an optical system that collects light preferentially from a defined area in a hostile environment and transmits this light to a detector remotely located in a benign environment.

BEST MODE FOR CARYING OUT THE INVENTION

Figure 1:
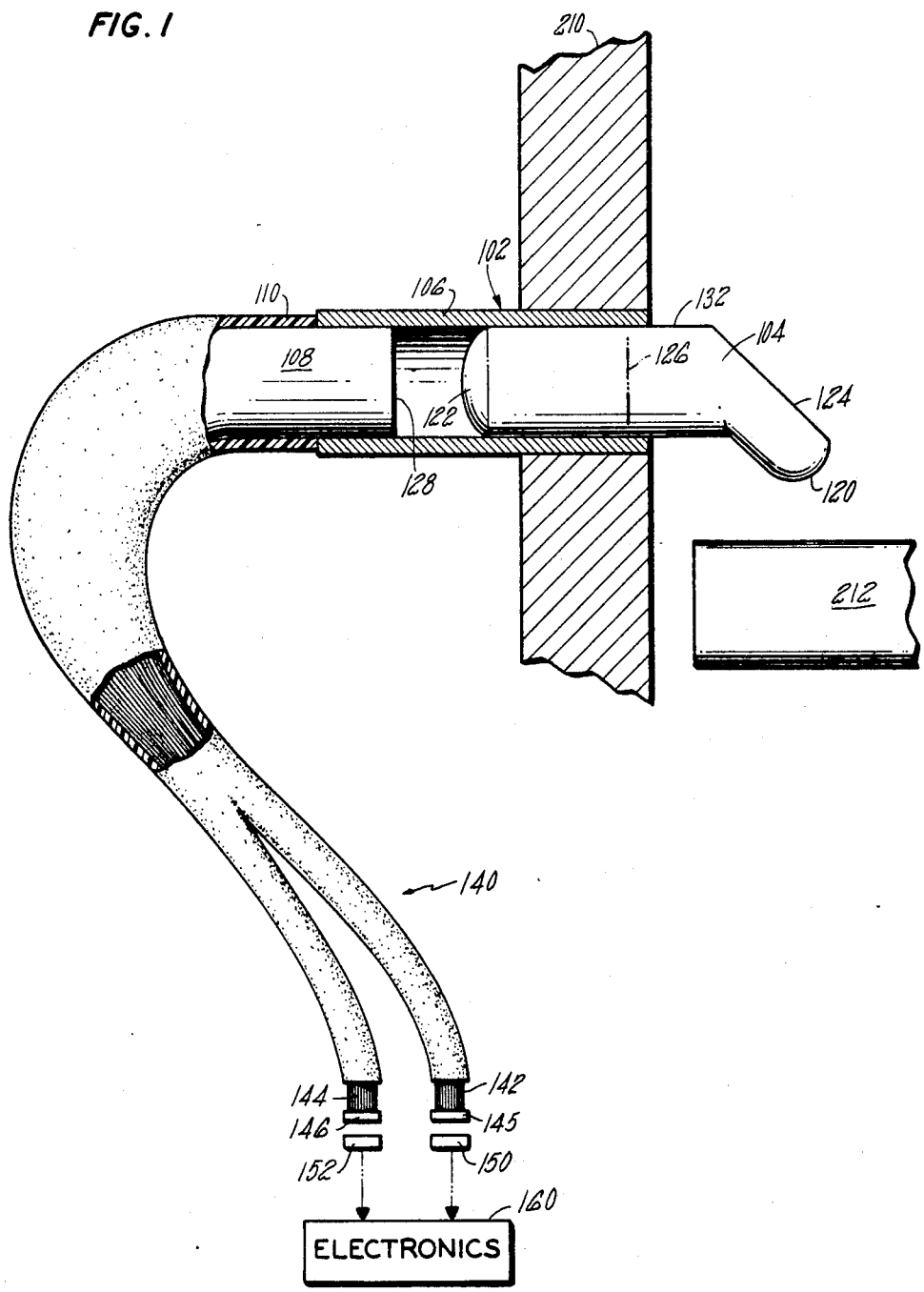
FIG. 1 illustrates an embodiment of the invention.

In FIG. 1, wall 210 of the combustion chamber of a jet engine is penetrated by sensing head 102, constructed according to the invention, for collecting light from the hostile environment (high temperature, high vibration) within the jet engine and transmitting that light to optical detectors located outside the combustion region of the jet engine. The light to be collected is emitted by element 212, illustratively a rotor within the engine, the temperature of which is to be measured. Light emitted from rotor 212 is focused by curved surface 120, the first surface of sensing head 102, is reflected off flat surface 124 set at a predetermined angle to reflect light from the defined area along the axis of element 104. The light being transmitted along the axis is reimaged by curved surface 122, which forms an image at front surface 128 of fiber bundle 108. The light is then transmitted along optical fiber bundle 108 and is divided in divider 140 into two separate paths which transmit light through connectors 145 and 146 to detectors 150 and 152.

Element 104 is illustratively formed of sapphire ground and polished to form the aforementioned focusing elements. Element 104 is positioned and protected by ferrule 106, a cylinder formed from stainless steel or any other strong, corrosion resistant material. Ferrule 106 also maintains the ends of optical fiber bundle 108 in correct alignment with element 104. The ends of the individual fibers of fiber bundle 108 within ferrule 106 may be fused together, glued together or otherwise fastened to form a smooth, transparent block that does not impede the passage of radiation through it. Front surface 128 of fiber bundle 108 is ground and polished to permit the easy passage of light therethrough. Fiber bundle 108 is enclosed in protective sheath 110 to protect the individual fibers within from heat, moisture and dirt. At a safe distance from wall 210 of the engine, fiber bundle 108 is divided in conventional divider 140 which terminates in two legs 142 and 144. The individual fibers which go into the two legs may be randomly selected or may be preferentially selected to respond to different areas within the engine. Legs 142 and 144 terminate in optical fiber connectors 145 and 146 which emit light to detectors 150, 152. Detectors 150 and 152 are illustratively spectrally sensitive detectors, using either filters in broadband detectors or narrowband detectors, which sample the intensity of radiation at two different wavelengths and thus furnish input signals to electronics 160 which calculates the temperature of rotor 212 by conventional means.

Element 104 may be fused silica or any other material that will transmit the radiation of interest and also withstand the hostile environment. The surface 124 may be coated with a metallic film or a conventional dielectirc reflective coating, if the coatings will withstand the environment. Coatings, which have the advantage of reducing the amount of extraneous light, may also be applied to other exposed surfaces of sensing head 102, or it may be enclosed in a light shield. The details of an embodiment of the invention will vary depending on the amount of light that must be collected, the relative positions of the sensing head and the object to be measured (and it is a further advantageous feature of the invention that variation of the radius of curvature of surface 120 and the angle of surface 124 with respect to the axis permits great freedom in the location of the sensing head).

One embodiment designed to collect light from the turbine of a jet engine for in-situ, in-flight measurements has a diameter of shaft 104 of 0.16 inches, an angle of surface 124 with respect to the axis of 35°, an angle of 110° between the axis and the center of surface 120, a radius of curvature of 0.221 inches for surface 120 and of 0.140 inches for surface 122.

The prior art elements referred to above are both unfocused in tht they are simple, cylindrical rods which do not select the light from any particular area. Indeed, both specifications of the above-mentioned patents refer to the optical rod being bathed in the flame, the temperature of which is to be measured. In contrast, the present invention is directed at the measurement of the temperature of a particular element within the jet engine, not at the temperature of a flame. It is necessary, therefore, to discriminate against light coming from other sources of radiation. Of course, since the temperature of the entire interior of a jet engine is very high, all elements as well as the combustion gases of the engine will be radiating infrared radiation, but an element constructed according to the principles of the invention will be able to emphasize light from the desired region. The curved front surface 120 of element 104 and the flat reflective surface 124 combine to select light emitted a predetermined distance away from rod 104 and to reject light coming from shorter distances. The rejection is accomplished in part by reflecting from surface 124 light entering at unwanted angles into the surface 132 of rod 104. Advantageously, surface 132 may be roughened in order to eliminate total internal reflection and to maximize loss of light striking surface 132. Further, if desired, a field stop may be placed at any convenient position in the optical path. If surface 120 brings light to a focus at focal plane 126, a field stop may be placed at that point. Light entering surface 120 at different angles from that of the light emitted from rotor 212 or from combustion gases between rotor 212 and surface 120 will be focused before or after plane 126 and will be discriminated against by the field stop.

Figure 2:
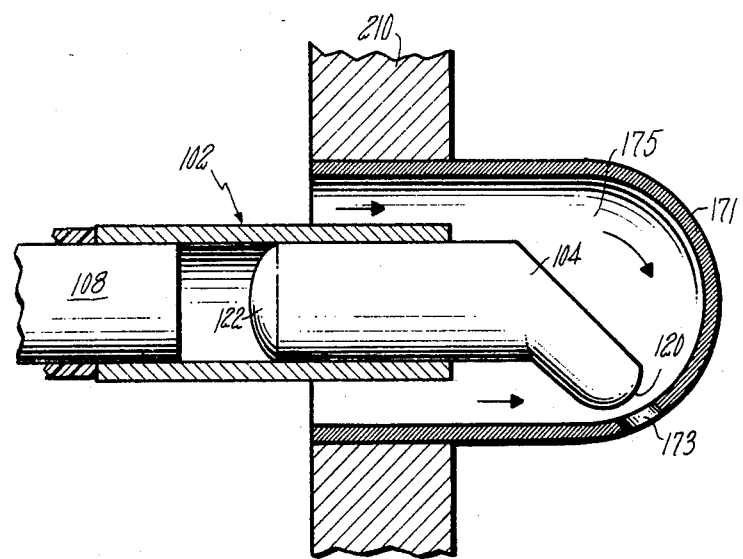
FIG. 2 illustrates a detail of an alternate embodiment.

A detail of an alternate embodiment is illustrated in FIG. 2, in which sensing head 102 is positioned by supports not shown within protective sheath 171. head 102 is surrounded by purge gas 175 which flows from the exterior of wall 210 around head 102 and out hole 173 into the engine. Hole 173 is positioned to assist in defining the field of view of head 102. Sheath 171 may be made of stainless steel or any other light-blocking temperature resistant material.

We claim:

1. An apparatus for collecting optical radiation preferentially from a defined region in a first environment and transporting said radiation to a second environment comprising:

a heat-resistant optical collector transmissive to said radiation and having an internal axis extending from a first end to a collecting end at a predetermined position within said first environment, said collector having a first curved surface having a first radius of curvature on said first end and a reflective surface disposed in said collecting end for reflecting along said axis collected radiation passing through and focused by a second curved surface having a second radius of curvature, said second surface being disposed with respect to said axis and said reflective surface such that said collected radiation reflected along said axis is preferentially collected from a defined region within said first environment and is directed along said axis and through said first curved surface which defined region is located a predetermined distance along an external axis passing through said second curved surface and said reflective surface, said apparatus having a sensitivity for optical radiation that varies as a function of position along said external axis, said sensitivity having a predetermined maximum value for radiation emanating from said defined region;

optical transmission means, having an entrance end and an exit end in said second environment, for transmitting out said exit end radiation passing through said first curved surface and entering said entrance end; and heat-resistant means for maintaining said entrance end in proximity to said first end and for maintaining said collecting end in said predetermined position within said first environment.

2. An apparatus according to claim 1, in which at least said reflective surface of said collecting end is rendered nontransmissive to ambient radiation within said first environment by means of radiation blocking means disposed in proximity to said reflective surface of said collecting end, said radiation blocking means having at least one radiation transmissive aperture for permitting the passage of radiation from said defined region to said first curved surface.

3. An apparatus according to claims 1 or 2, in which radiation entering said second curved surface from said defined region is focused by said second curved surface trhough a transmissive aperture in an otherwise nontransmissive region of said optical collector, whereby radiation emanating from regions of said first environment other than said defined region is reduced in intensity relative to radiation emanating from said defined region.

4. An apparatus according to claim 3, in which said first end and said entrance end are disposed in said second environment.

* * * * *